Oct. 11, 1955     G. T. BALFE     2,720,406
GASKET
Filed Oct. 18, 1950
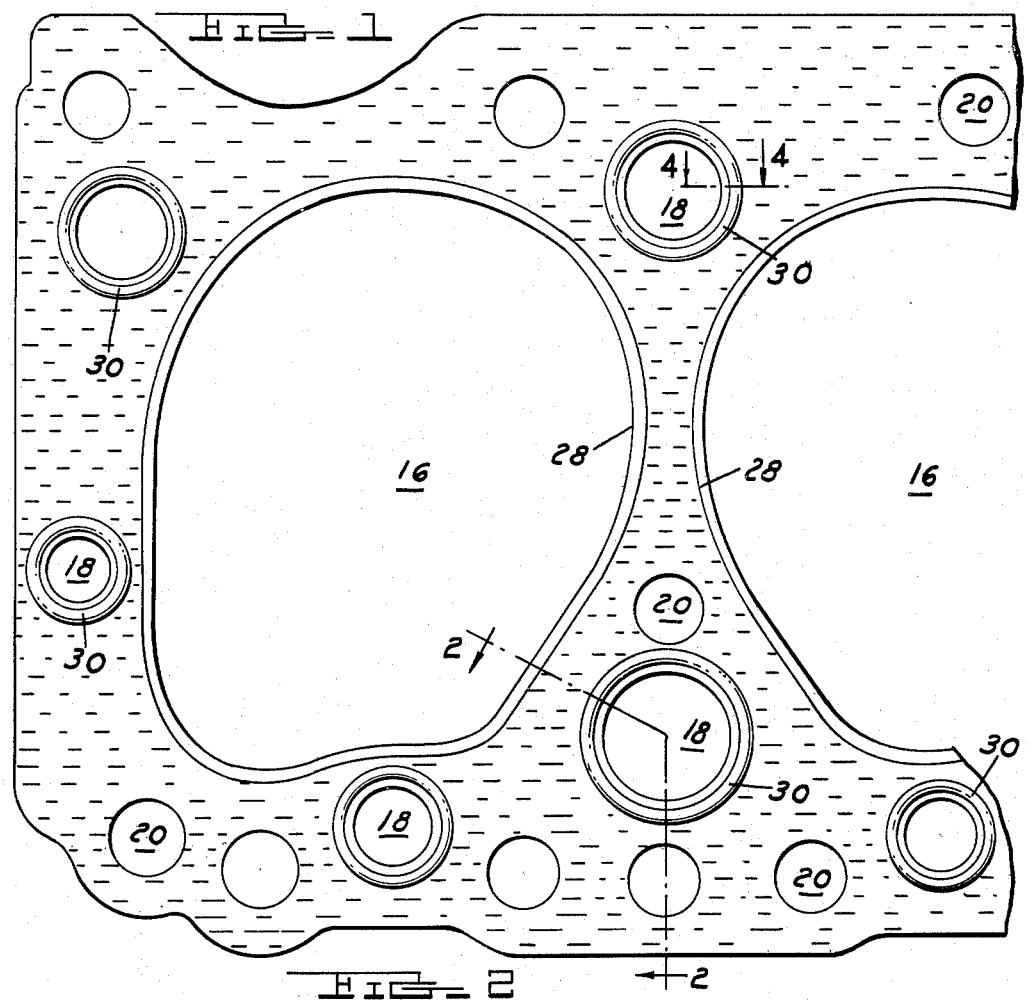
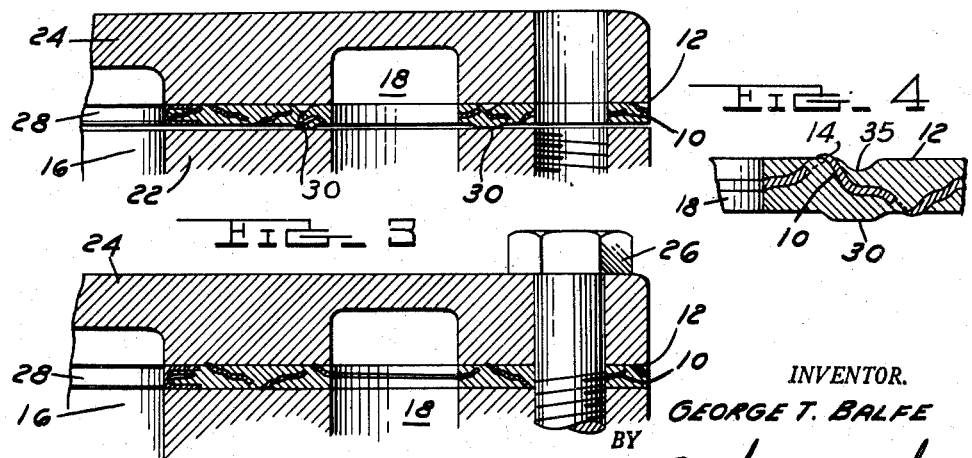
INVENTOR.
GEORGE T. BALFE
BY
Burton & Parker
ATTORNEYS

United States Patent Office 2,720,406
Patented Oct. 11, 1955

2,720,406
GASKET

George T. Balfe, Detroit, Mich., assignor to Detroit Gasket & Manufacturing Company, Detroit, Mich., a corporation of Michigan Application October 18, 1950, Serial No. 190,846

1 Claim. (Cl. 288—21)

This invention relates to improvements in gaskets.

It relates particularly to improvements in gaskets provided with a plurality of service openings each of which openings require sealing for the gasket effectively to serve its purpose. An example is a cylinder head gasket. Such a gasket is generally provided with water and oil service openings in addition to the service openings for the combustion chambers of the engine with which the gasket is associated. When such a gasket is compressed between the head and the cylinder block it must accomplish a tight seal about each of the service openings to effectively serve its function.

Heretofore gaskets have been provided with ribs or ridges struck up from the sheet of gasket material itself, as illustrated in applicant's Patent No. 2,152,630. Such a rib yielded under compression to effect a tight seal about the openings encircled by the rib. Heretofore gaskets have also been formed with metal grommets extending about the service openings, as illustrated in applicant's Patent No. 2,126,716, to protect the edge of the gasket sheet itself about such openings.

This invention is illustrated as embodied in a cylinder head gasket. Such a gasket is provided with combustion chamber openings and other service openings. Such other service openings may constitute oil and water service openings. A metal grommet is provided about each combustion chamber opening. The grommet protects the edge of the gasket sheet from the heat of combustion. The gasket sheet itself is deformed surrounding the other service openings providing ribs or ridges encircling such other openings, which ribs or ridges have an elevation greater than that of the grommet about the combustion chamber opening. Such rib or ridge is yieldable under compression.

When the cylinder head is tightened down on the block the ribs or ridges are placed under compression and resistingly yield to effect a tight seal about the service openings encircled thereby before the seal is accomplished about the combustion chamber openings. When the gasket has been tightened down to the point that the metal grommets are placed under compression about the combustion chamber openings the ribs have all been flattened out to the point that an effective seal has been accomplished about all of the other service openings.

Due to the irregularities which accompany production there are slight variations between the cylinder head and the face of the block and in the thickness of the gasket itself. When a gasket is provided with combustion chamber openings and other service openings the margins of which exhibit a uniform elevation and thickness and particularly when grommets are provided about the combustion chamber openings it has been found that the head may be tightened down upon the gasket against the grommets about the combustion chamber openings without sealing the margins of the other service openings at all points.

The gasket of this invention is so constructed that the margins of the service openings other than the combustion chamber openings will be sealed before the gasket is sealed about the combustion chamber openings. The metal grommets about the combustion chamber openings establish the limit of the compression of the gasket.

Other objects, advantages and meritorious features will more fully appear from the following specification, claim and accompanying drawings, wherein:

Fig. 1 is an elevation of a fragment of a cylinder head gasket embodying the invention;

Fig. 2 is a sectional view taken on the line 2—2 of Fig. 1 showing the gasket in place between the cylinder head and the cylinder block and prior to tightening down of the head upon the block;

Fig. 3 is a sectional view taken on the same line as Fig. 2 but following the tightening down of the head upon the block;

Fig. 4 is a vertical sectional view taken on the line 4—4 of Fig. 1 somewhat enlarged in cross section.

This invention is illustrated in connection with a gasket of the general character shown in my Patent No. 1,776,140. In such patent and in the gasket herein disclosed the gasket sheet material is a laminated sheet comprising an insert layer of metal 10 interposed between two outer layers 12 of suitable packing material. This packing material may be composition asbestos or other suitable fibrous material. The metal insert layer 10 has small projecting tongue-like portions 14 punched therefrom and extending outwardly from opposite sides. Preferably these tongue-like portions are relatively small and are arranged compactly together. The tongues extend into the packing layers to secure the packing layers 12 to the metal insert. As shown these tongue-like portions extend through the packing layers and are clenched over upon the surface of such packing layers and form continuous barriers extending through the gasket material. This particular arrangement of insert layer provided with tongues and packing layers secured to opposite sides thereof is disclosed in the prior patents referred to.

A cylinder head gasket as conventionally used in the trade is provided with a plurality of combustion chamber openings indicated in Fig. 1 as 16 and water and oil service openings indicated in such figure as 18. Bolt or screw openings 20 are also provided. This type of gasket is interposed between a cylinder block 22 and the combustion chamber head 24. As shown in Figs. 2 and 3, the head is secured to the block by screw bolts 26 as shown in Fig. 3.

Such a gasket is provided to form a tight seal between the head and the block about all of the service openings. The term "service openings" as here used includes the combustion chamber openings and the oil and water connection openings.

In order to protect the edge of the gasket sheet about the combustion chamber openings a metal grommet 28 is provided about each combustion chamber opening. This grommet is folded over the opposite sides of the gasket about the margin of the opening and encircles the opening as shown in the figures of the drawing. The grommet lies substantially within the plane of the gasket sheet material itself.

In the production of internal combustion engines there may be found irregularities between the cylinder block and the head of the block so that when the head is tightened down upon the block it may not seat tightly thereagainst at all points. For this reason a gasket is provided. Under certain variations in manufacture it may develop that when the head is tightened down against the conventional gasket in use in the industry that a tight seal may not be formed by the gasket at all points about the circumference of each of the service openings to be sealed. The head may seal tightly against the grommets about the combustion chamber openings but fail to seal at all points about the other service openings. The gasket of this application is provided to overcome this deficiency of the conventional gasket.

In the gasket herein described there is provided a ridge or rib 30 about each of the service openings other than the combustion chamber openings. This rib is formed by embossing the laminated gasket sheet, the rib or bead 30 being formed on one surface of the laminated gasket sheet and a groove 35 being formed in the other surface of the laminated gasket sheet in a position coinciding with the bead 30, as shown in the figures of the drawing. The metal insert 10 is deformed so as to maintain such embossment. This embossment projects on one surface above the plane of such surface to a height greater than the heighth of the grommet above the combustion chamber opening. Normally such bead may be elevated .015 to .025 of an inch above the surface of the gasket sheet.

When the gasket is interposed between the cylinder block and cylinder head it will occupy the position shown in Fig. 2. In such figure the bead 30 is seated against the block all the way around the service opening which it encircles but the grommet 28 is not seated against the block. When the head is tightened down upon the block, the bead 30 is resistingly flattened out. As this bead is flattened out it not only forms a tight joint with the block along what was the crown of the bead, but it forms a tight joint with the head along the opposite surface of the gasket adjacent the edges of the debossment produced by the formation of the bead. The gasket is therefore sealed about each of the service openings other than the combustion chamber openings prior to sealing of the gasket by the grommets about the combustion chamber openings.

This compression of the gasket and the flattening out of the bead is against the resistance of the deformed insert and the metal is strained to maintain at all times a tight seal along the line of the bead. The limit of the compression of the gasket is established by the grommet about the combustion chamber opening. When the head is tightened down to seal upon such grommet the bead has already been flattened out.

What I claim is:

A gasket for use between a cylinder head and an engine block comprising: a flat laminated sheet of gasket material shaped to exhibit a combustion chamber opening, a liquid opening, and a bolt hole opening; said laminated sheet of gasket material including a core layer of metal and co-extensive layers of gasket cushioning material covering both sides of the metal layer with the metal layer having projections struck up therefrom in opposite directions and embedded within the cushioning layers; a metal grommet embracing the peripheral margin of the gasket sheet surrounding the combustion chamber opening with the opposite sides of the grommet lying substantially within the plane of the gasket sheet and protecting the edge thereof about said opening from the heat of combustion and adapted to be compressed between the cylinder head and the engine block; said laminated gasket sheet including the core layer being laterally deformed throughout a portion thereof adjacent and surrounding said liquid opening providing a bead of gasket material on one surface and a groove in the other surface coinciding therewith surrounding the opening, the top of the bead being above the top surface of the grommet and above the plane of the face of the gasket sheet providing an area of gasket material surrounding the liquid opening, said bead area of gasket material surrounding the liquid opening being initially resistingly compressed and flattened when the cylinder head is tightened toward the engine block prior to compression of the grommet, said grommet when compressed between the head and the block establishing the limit of compression of the gasket between the block and the head.

References Cited in the file of this patent

UNITED STATES PATENTS

| | | |
|---|---|---|
| 1,245,003 | Mastin | Oct. 30, 1917 |
| 1,917,214 | Bailey | July 11, 1933 |
| 1,957,798 | Oven | May 8, 1934 |
| 2,026,854 | Victor | Jan. 7, 1936 |
| 2,058,010 | Fitch | Oct. 20, 1936 |
| 2,152,630 | Balfe | Apr. 4, 1939 |
| 2,330,106 | Bernstein et al. | Sept. 21, 1943 |